Patented Feb. 22, 1949

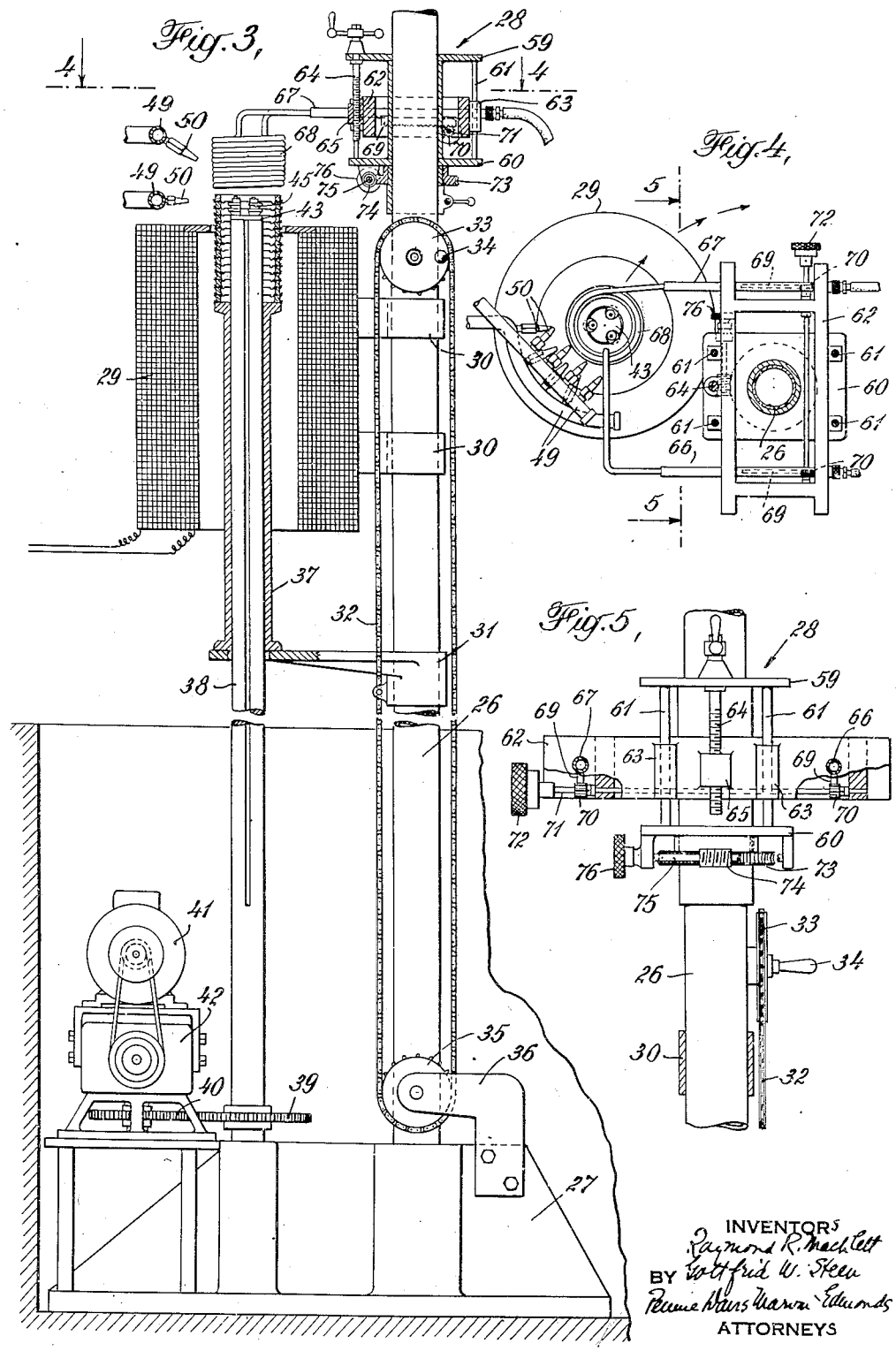

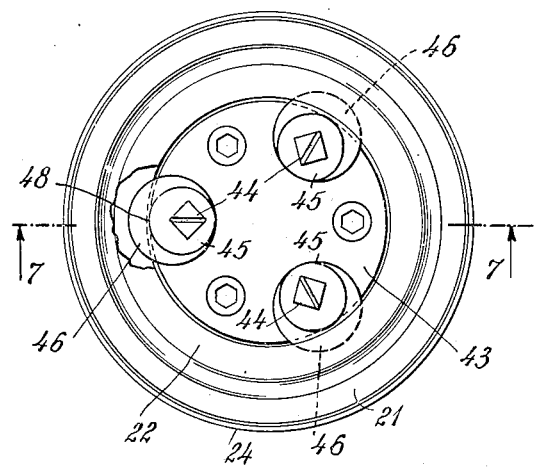
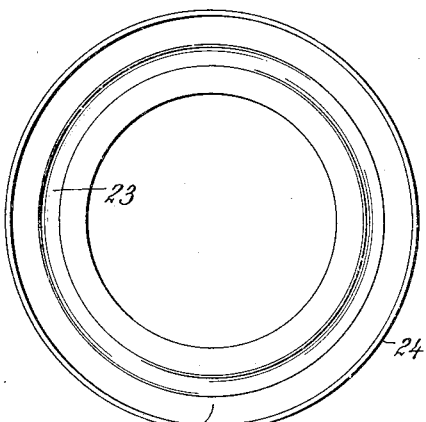
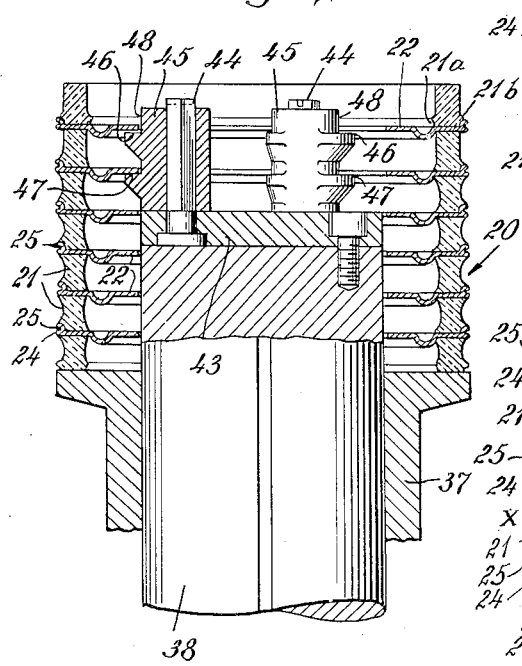
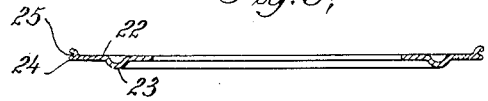
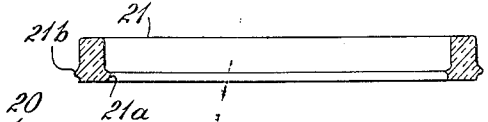
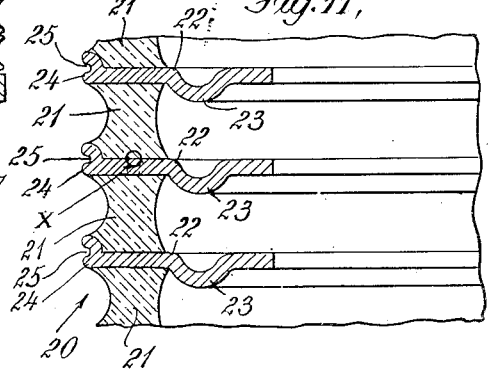

2,462,205

UNITED STATES PATENT OFFICE 2,462,205

METHOD FOR MAKING METAL-GLASS SEALS

Raymond R. Machlett, New Canaan, and Gottfrid W. Steen, Stamford, Conn., assignors to Machlett Laboratories, Incorporated, Springdale, Conn., a corporation of Connecticut Application March 19, 1945, Serial No. 583,462

2 Claims. (Cl. 49—81)

This invention relates to the production of glass-metal seals and is concerned more particularly with a novel method by which glass and metal can be united to make joints that are capable of withstanding a high vacuum and are also mechanically strong.

Vacuum-tight glass-metal seals have been produced for years in the manufacture of vacuum tube apparatus and a number of alloys, such as that known commercially as Kovar, which have a coefficient of expansion closely approximating that of certain types of glass, have been developed for the purpose. The technique of making such seals varies somewhat, depending upon the nature of the parts to be united, but, although it is well known and widely practiced, little seems to have been known heretofore as to the precise conditions necessary within the joint to insure that it will be leak-proof.

In the formation, in accordance with present practice, of a typical metal-glass seal, such, for example, as that used for joining the stem of the anode of an X-ray tube to the wall of the envelope, the metal part of the seal is in the form of a tube of a suitable alloy, such as Kovar. This tube is joined at one end to the anode shank in a preliminary operation, as by brazing, and its free end is then sealed to a length of glass tubing, which is later united to the main body of the envelope by a glass blowing operation. To make the seal, the anode or the anode shank with the metal tube in place thereon is mounted in one chunk of a glass blowing lathe, and the length of glass tubing is mounted in the other chuck of the lathe in alignment with the metal tube. With the lathe operating to rotate the chucks, the separated but closely adjacent ends of the glass and metal tubes are heated by a flame until the parts have reached the proper temperature and the glass has softened. The hot ends of the glass and metal are then brought together so that the end of the metal tube penetrates the end of the glass tube. The heating is then continued for some time, until the workman, on the basis of his experience, judges that a good seal has been obtained.

It will be observed that, in the practice of the method above described, the glass and metal parts to be sealed together are heated while they are out of contact with one another, and are then brought together. When this procedure is followed, all portions of the metal can be brought initially to the desired temperature by direct impingement of the flame and, in the final heating, the flame can be applied to both metal and glass, and, since the sections are thin, the proper temperature within the joint can be readily maintained. The method described may, therefore, be successfully used in making vacuum-tight seals between relatively thin parts of such shape and size as to permit their easy manipulation, or their mounting in holders, such as chucks, that can be easily manipulated.

In some instances, however, the glass and metal parts are to be united over areas of substantial size and the nature of the seal between them and the shape and size of the parts are such that they cannot be independently supported and handled. An example of such a sealing operation is that required in the manufacture of the insulating structure disclosed in the patent of Machlett and Skehan, No. 2,376,439, issued May 22, 1945. That structure is made up of alternating sections of glass tubing and open center metal discs sealed together, and the glass sections are about a quarter-inch in height in a practical structure and have an outer diameter not substantially less than that of the discs but a considerably less inner diameter. The width of the sealed areas may be about a quarter-inch and the outer diameter of a glass section about three inches, so that the sealed areas are of substantial size.

In the production of the structure of Patent No. 2,376,439 referred to, the prior method of sealing above described cannot be used, because the shape and size of the glass sections are such that they cannot be manipulated by hand or mounted in holders. The obvious method of sealing such discs and glass sections together would appear to involve placing them one upon the other and heating them until the glass melts sufficiently to wet the metal and become sealed thereto. When such a procedure is tried, it is at once apparent that the metal disc must rest upon the glass, since, with the parts reversed, the metal loses so much heat to the support that a seal can be made only with the greatest difficulty, if at all. However, when the flame is applied to the metal disc and the glass section upon which it rests, it develops that the parts cannot be raised to the desired temperature without at the same time causing the glass to flow out of shape, and the overhang of the metal disc is such that it is not possible to reach the inner surface of the glass section and restore it to shape by working it with a paddle. Accordingly, seals made by the procedure described are either leaky and unsatisfactory for vacuum tube use or else the glass is so badly distorted that the united parts are unusable.

In attempts to solve the problem of making the seals required in the insulating structure referred to, we have conducted many experiments, as a result of which, we believe that we have ascertained the conditions necessary within a glass-metal seal to insure that it will be vacuum-tight and mechanically strong. The present method is based on those discoveries and, although it will be described as employed for making the seals used in the production of the insulating structure, it will be apparent that it has a much broader application.

When glass and metal parts are heated in the operation preliminary to their being actually sealed together, a film of oxides forms on the metal and the thickness of the film depends on the time and temperature involved in the heating operation, prior to the time that the glass flows into intimate contact with the metal and prevents further oxidation thereof. The interface between the unoxidized metal and the oxide film is covered with minute irregularities and the film is, accordingly, interlocked with the unoxidized metal to a greater or less extent. As the glass in contact with the film reaches the melting point, the oxides begin to dissolve in and be absorbed by the glass, and, if that part of the glass in contact with the film is kept at the right temperature for the right length of time, the oxides will dissolve and the glass will wet the irregular surface of the unoxidized metal and fill the depressions therein to the extent necessary to insure that there will be no path across the seal from one side to the other that does not pass through a place where all the oxides have been absorbed. When that condition is attained, the seal will be vacuum-tight.

The present invention is, accordingly, directed to the provision of a method for making uniformly vacuum-tight mechanically strong seals between glass and metal parts which are to be sealed together over areas of substantial size and are of such size and shape that they cannot be readily manipulated or mounted in holders. In the practice of the new method, the parts to be sealed together are placed in contact and passed through a temperature time cycle which insures that the conditions above set forth will be fulfilled. The use of the new method thus makes it possible to produce uniformly satisfactory seals of a type which it has not been possible to make by any of the prior methods.

For a better understanding of the invention, reference may be made to the accompanying drawings, in which Fig. 1 is a view in perspective with parts broken away of part of an apparatus suitable for practicing the method of the invention in the formation of seals of a particular type;

Fig. 3 is an elevational view of the apparatus with parts shown in section;

Fig. 4 is a sectional view on the line 4—4 of Fig. 3;

Fig. 5 is a sectional view on the line 5—5 of Fig. 4;

Fig. 6 is a plan view of part of a column of the apparatus;

Fig. 7 is a sectional view on the line 7—7 of Fig. 6;

Figs. 8 and 9 are plan and sectional views, respectively, through one of the metal discs used in the sealing operation;

Fig. 10 is a sectional view of a glass section used in the sealing operation;

Fig. 11 is a fragmentary sectional view on an enlarged scale of the structure formed by the sealing operation;

Figure 1:
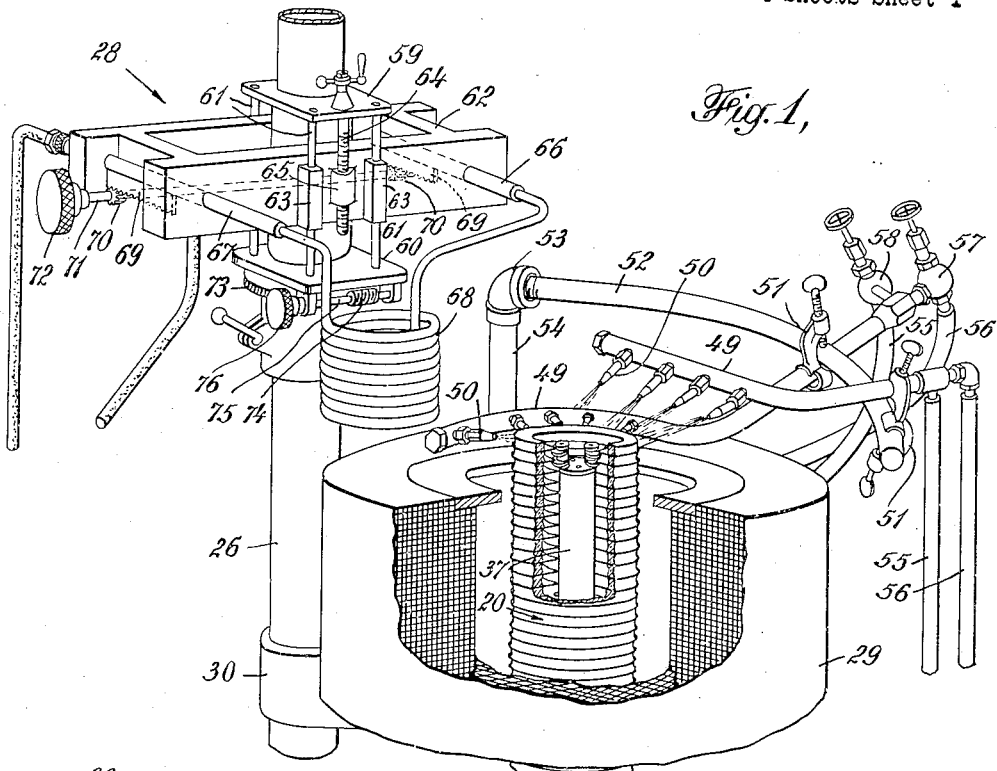
Figure 2:
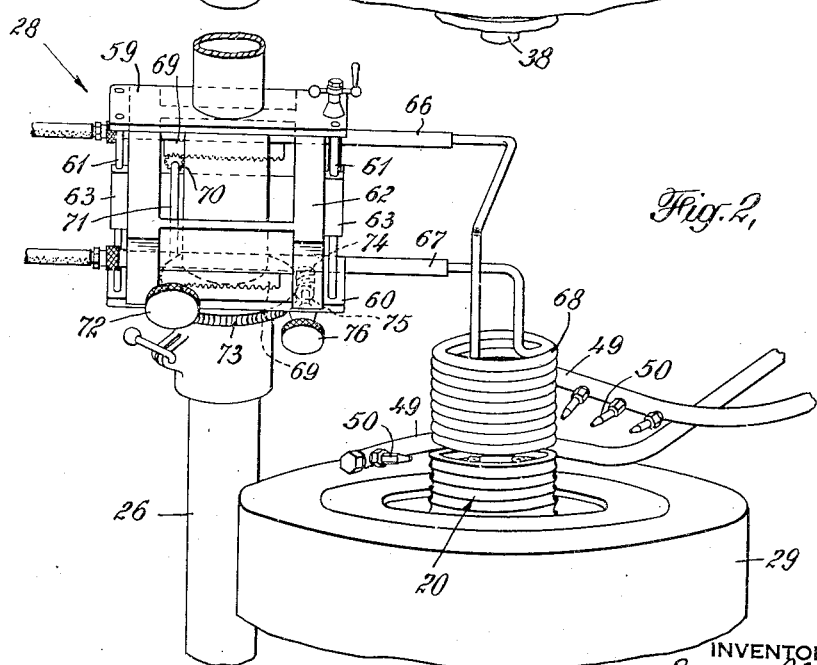
Fig. 2 is a view similar to Fig. 1, showing parts of the apparatus in different positions.
Figure 12:
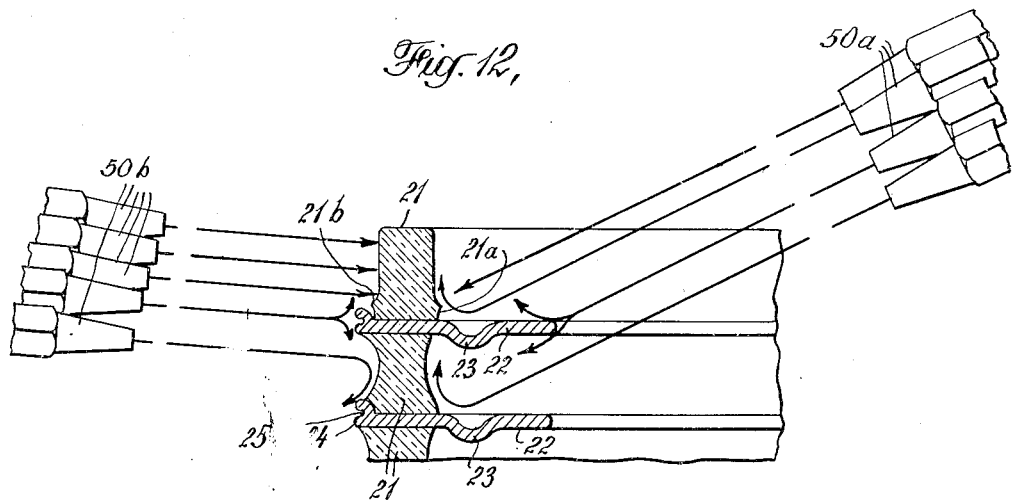
Fig. 12 is a sectional view through part of the structure being produced by the sealing operation showing the axes of the flames.
Figure 13:
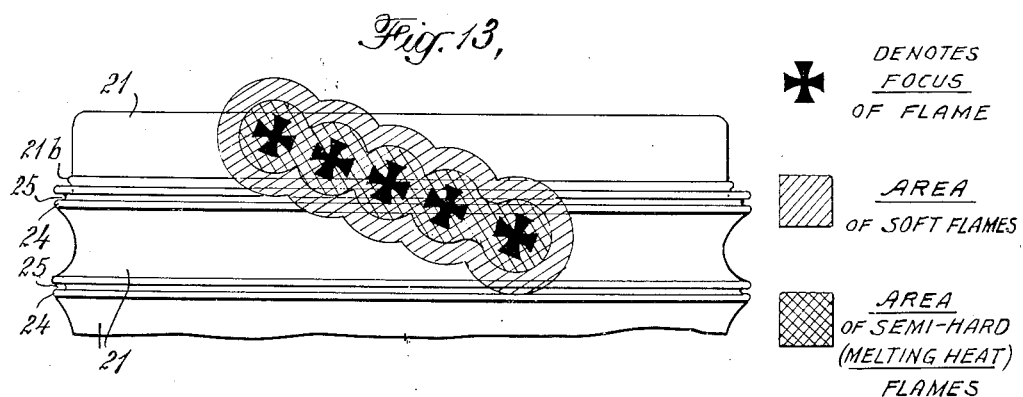
Fig. 13 is a view of the structure in side elevation showing the zones of flame impingement on the outer surface of the assembly.

In the drawings, the apparatus illustrated is suitable for practicing the new method in the production of an insulating structure of Patent No. 2,376,439. The structure, generally designated 20, is made up of a plurality of alternate glass sections 21 and metal discs 22 sealed thereto and each metal disc has an open center and it is formed with a circumferential rib 23. At its outer rim, the metal is shaped to form a circumferential rib 24 which may have a groove 25 for reception of a conductor. The metal discs are made of an alloy having a coefficient of expansion approximately that of the glass to be used and may be formed of the alloy known commercially as Kovar.

The glass sections are made of a suitable glass, such as that known commercially as Pyrex, and at one end each section is formed with an inwardly projecting rib 21a and an outwardly projecting rib 21b, the ribs providing additional glass at places where it is needed in the sealing operation. The internal diameter of a section across rib 21a is approximately the same as the diameter of a metal disc to the outer edge of rib 23, and the section has a thickness approximately equal to the radial distance across the disc from the outer edge of rib 23 to the inner edge of the rib 24. In the completed structure, the glass is sealed to opposite faces of each disc.

The apparatus shown in Figs. 1 to 7 inclusive, includes a column 26 rising from a suitable base 27, and as the column may be of substantial height and the top of the column must be accessible to the workman, the base may be placed in a pit. A support 28 for a high frequency coil is adjustably clamped at the top of the column, and below the support, an annealing oven 29, which may be electrically heated, is secured to the column by suitable clamps 30. A bracket 31 is mounted on the column for vertical movement below clamps 30 and the bracket is attached to a link of a chain 32 so as to be movable thereby. The chain is trained about an upper pulley 33 mounted on the column and provided with a handle 34 and also about a lower pulley 35 mounted in a bracket 36 attached to the base. By rotation of pulley 33, the chain may be moved to cause bracket 31 to move up or down the column as desired.

The bracket 31 supports a sleeve 37 which is mounted on and splined to a shaft 38 in which is mounted at its lower end for rotation a suitable bearing in base 27. Shaft 38 carries a gear 39 driven by gear 40, which is in turn driven by a motor 41 through a gear box 42. The operation of the motor causes shaft 38 to rotate slowly, the sleeve 37 rotating with it.

A plate 43 is mounted on top of shaft 38, and through this plate, project three studs 44 spaced 120° apart and provided with blocks 45 formed with spaced projections 46 and 47 lying one above the other at one side of the block. The distance between the upper surfaces of projections 46 and 47 is the distance at which it is desired that the discs 22 be spaced in the finished structure. Studs 44 and their blocks 45 are rotatable, and when the studs and blocks are in the position shown in Fig. 7, the outer surfaces 48 of the blocks lie close to the inner edge of discs 22 mounted on projections 46 and 47. When the blocks or studs are turned through 180°, the projections pass from beneath the inner edges of the discs so that the discs may move downwardly along the blocks.

A pair of burner pipes 49 are mounted near the upper end of shaft 38, and each such pipe is provided with a plurality of burner nozzles 50. The pipes may be adjustably mounted on any suitable support, and in the construction shown, the pipes are attached by clamps 51 to a horizontal length of pipe 52 threaded into an elbow 53 on a vertical length of pipe 54 supported in any convenient manner. The constituents of the combustible mixture are supplied to each burner pipe 49 through tubes 55, 56, and the flow of the gases is controllable by valves 57, 58, of which only one set is shown.

The support 28 comprises upper and lower plates 59, 60 connected by vertical rods 61. A frame 62 made up of four bars is provided with sleeves 63 on the respective rods 61, and the frame can be moved up or down by a screw 64 threaded through plate 59 and through a sleeve 65 on the frame. A pair of tubes 66, 67 forming leads for a high frequency coil 68 extend through openings in the frame 62, and the coil has a diameter approximately the same as disc 22. The leads 66 and 67 have attached thereto racks 69 which can be actuated by pinions 70 on a shaft 71 mounted for rotation in openings in bars of the frame 62 and provided with a handle 72. By rotation of the handle and shaft, the leads 66, 67 may be moved in or out relative to frame 62 to adjust the position of coil 68. The coil 68 can be adjusted angularly with reference to column 26 by means of a worm gear 73 attached to plate 60 and movable by means of a worm 74 mounted on a shaft 75 in brackets attached to plate 60, the shaft being provided with a handle 76.

In the production of the insulating structure by means of the apparatus described, the studs 44 and the blocks 45 are first turned so that the projections 46, 47 extend radially with reference to the axis of shaft 48. A glass section is then placed on top of the supporting sleeve 37 and the position of the sleeve on shaft 38 is adjusted until the plane of the top of the section lies a short distance, such as $\tfrac{1}{16}''$, above the level of the tops of the projections 46. A metal disc 22 is then placed on top of the glass section and another glass section 21 is placed on top of the metal disc. The burners are then turned on, the burner pipes having previously been adjusted so that the flames from the nozzles 50a of one pipe strike the inside of the glass sections, while those from the nozzles 50b strike the outside of the sections and also impinge on the rim 25 of the disc. The flames from the nozzles are arranged in a row inclined slightly to the horizontal so that the flames strike the walls of the sections at successively higher levels. The flames from nozzles 50b are so adjusted that the soft flames surrounding the hard cones spread out beneath the rim of disc 22.

With the burners thus adjusted and operating, the shaft 38 is rotated and the heating is continued until the metal disc and the glass sections above and below it have been heated to a temperature from about 850° to about 900° C., an operation that takes about a minute and a half. In this heating, the metal becomes red, mainly from flame impingement and partly from heat transferred from the glass, and an oxide layer of the order of 0.0005'' thick is formed upon it. As the heating progresses, the glass softens and wets both top and bottom surfaces of the disc and, as a result of the softening of the bottom glass section, the disc and top glass section move down under the influence of gravity toward the tops of the projections 46. In such movement, the disc is guided by the outer surfaces 48 on blocks 45 and the movement continues until the disc alights on the top surfaces of projections 46. The bottom glass section is slightly deformed by the sinking of the disc with the top glass section thereon, but the movement of the disc insures its intimate contact with the top of the bottom section.

When the assembly has reached a temperature within the range stated, the top glass section is worked back to its original shape and height by suitable tools and the outer surface of the bottom section is also properly shaped in the same way. The gas flames are then cut off and the coil 68 is swung over the assembly and the current turned on. The high frequency field of the coil causes the metal disc to be heated from within by induction and that part of the metal, which was shielded from flame impingement by the glass sections in contact therewith, is raised to a temperature from about 900° C. to about 925° C., while the metal exposed beyond the glass may reach a temperature from about 925° C. to about 950° C. The induction heating operation requires from one to two minutes and, while it is in progress, those parts of the top and bottom sections in direct contact with the oxide film on the metal absorb the oxides and wet the irregular surface of the unoxidized metal.

During the preliminary flame heating, the formation of the oxides on the metal has given the surfaces of contact between the glass and metal a black appearance. As the induction heating continues and the oxides are dissolved in the glass, the contact surfaces become gray. If the temperature in the induction heating period is allowed to drop too low, the time of solution of the oxides increases and the increase in the time required seems to vary out of proportion to the decrease in temperature. If the induction heating is continued too long, the contact surfaces become silvery, and while such seals are vacuum-tight, they are likely to be mechanically weak.

When the metal has been inductively heated to the desired temperature for the necessary length of time, the coil is swung back out of the way and the current cut off. The burners are again turned on and the assembly is heated to raise the temperature of the top glass section to about 850° C. This causes that section to be softened and it is then worked by suitable paddles to the desired shape and height, preparatory to the seating of the next metal disc thereto. This operation takes from about half a minute to a minute.

After the first seals between a metal disc and the glass sections above and below it have been completed, the studs 44 and blocks 45 are turned to allow the disc to drop down and come to rest upon the tops of projections 47. A second disc is then mounted on top of the top sealed glass section, and a glass section is placed on top of the second disc. The top sealed glass section is somewhat higher than the spacing between the tops of projections 46, 47, so that it supports the metal disc slightly above the level of the tops of projections 46.

When this second assembly has been prepared, it is subjected to the same cycle of heating operations as before, that is, the assembly is first heated by flames, the metal alone is then heated inductively to effect solution of the oxides, and the assembly is further heated to soften the uppermost glass section to permit it to be worked into shape. In the initial flame heating, as before, the glass section beneath the second metal disc softens and that disc with the glass section resting upon it moves down by gravity toward the first disc until it comes to rest upon the tops of projections 46. When the first and second discs are thus in contact with projections 47 and 46, respectively, the discs have the desired final spacing. During these operations, the sleeve 37 takes part of the load of the structure being formed.

Upon completion of the second sealing operation, studs 44 and their blocks 45 are rotated to let the first disc pass beneath projections 47 and the second disc to come to rest upon those projections. A third disc is then placed on top of the second section and a third section on top of the second disc, and the cycle of heating operations is carried out to make the desired seals. The addition of discs and sections in the manner described is then continued to produce a structure of the desired length. As the structure increases in length, sleeve 37 is moved down shaft 38 and the structure begins to move through the annealing oven 29. This oven is of such length that each seal lies within it for about a period of two hours, and within the oven, the seal is kept at a temperature of about 800° F.

Figure 14:
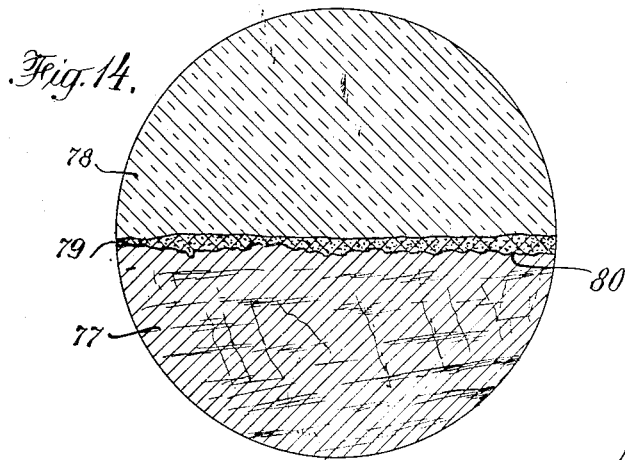
Fig. 14 is a view on a greatly magnified scale of a part of an area indicated on Fig. 11.

In Fig. 14, there is shown a cross-sectional view on a greatly magnified scale of a portion of the area designated X in Fig. 11. The areas 77 and 78 are cross-sections of metal and glass respectively, and the area 79 is that part of the glass in which the oxides formed on the metal in the initial heating operation have been absorbed by the glass. The line 80 indicates the surface of the unoxidized metal, and it will be observed to have irregularities into which the glass has entered when the oxides have been completely absorbed. The interlock between the glass and such irregularities appears to make the seal mechanically strong, and if the induction heating operation is continued too long, apparently some of the irregular projections from the metal disappear, in which event there is less interlock between the glass and metal. Whatever may be the explanation; the fact is that, if the induction heating is continued too long, the contact area between the glass and metal becomes lighter in appearance and the mechanical strength of the seal is decreased.

In the foregoing, we have described the new method as applied to the formation of the insulating structure of Patent No. 2,376,439 by means of a particular apparatus, but it is to be understood that such apparatus is not necessary for the practice of the new method and also that the sequence of operations carried on by the use of that apparatus may be varied. The essential features of the new method are the heating of the glass and metal to cause the formation of a film of oxide on the metal surfaces and the softening of the glass, so that it will make intimate contact with oxide film, and the heating of the metal by induction to bring about the solution of the film by the glass. In the flame heating, the glass and the portions of the metal not shielded by the glass are heated from without, but the part of the metal, which is shielded by the glass, cannot be raised to the desired temperature without heating the glass so that it becomes too soft and is too greatly distorted as a result of flow. In the induction heating, the metal is heated from within and that part of the metal, which is shielded by the glass and cannot be reached by the flame, is brought to the desired temperature. If the parts to be united were heated entirely by induction and without the use of the flame, the layer of oxides that would be formed on the metal before the glass softened sufficiently to flow into intimate contact with the metal and stop the oxidation, would be substantially thicker than that produced during the flame heating and the heating would have to be continued for a long time in order to effect satisfactory solution of the oxides.

In the method as above described, the initial heating is carried on by flame but any suitable source of external heat may be employed, as, for example, the parts to be joined may be heated in an oven. Also, in the method as described, the flames are cut off during the induction heating, and this is desirable, since, if the coil of the construction illustrated, which is kept cool by water circulation, were in operating position, water vapor in the burned gases might condense on the coil and short circuit adjacent turns or ground the coil through the metal disc being sealed with resultant damage to the disc. However, such difficulties can be readily overcome by the use of a coil of larger diameter and of a single turn, so that, for some purposes, it may be desirable to continue the flame heating at the same time that the inductive heating is going on. As the final flame heating is employed to heat the glass so that it may be shaped to prepare it for the next seal, it will be evident that these operations may not always be necessary, as, for example, when only one seal, in which the metal is shielded to a substantial extent by the glass, is to be made. In that case, the first seal may be made by the initial flame and the inductive heating operations and subsequent seals may be made by conventional methods.

The claims are:

1. A method of making a metal-glass structure consisting of cylindrical sections of glass and annular metallic discs arranged in alternation and sealed together in axial alignment, which comprises supporting a glass section with a disc resting upon the section and a second glass section resting upon the disc, the glass sections and disc being in axial alignment, heating the sections and disc by flames directed upon the outer and inner surfaces of the sections and disc to a temperature sufficient to cause the sections to soften and the disc to move downwardly under its own weight and that of the section resting upon it, the surface of the disc becoming oxidized during the heating, guiding the disc in its downward movement, arresting the downward travel of the disc after it is moved through a predetermined distance, discontinuing the flame heating, heating the disc by high frequency induction to a temperature higher than that to which it was heated by the flames and for a sufficient length of time to insure absorption in the glass of oxides on the surface of the metal, discontinuing the induction heating, heating the glass sections and disc by flame to a temperature at which the glass is soft, and mechanically re-shaping the top glass section.

2. A method of making a metal-glass structure consisting of cylindrical sections of glass and annular metallic discs arranged in alternation and sealed together in axial alignment, which comprises supporting a glass section with a disc resting upon the section and a second glass section resting upon the disc, the glass sections and disc being in axial alignment, heating the sections and disc by flames directed upon the outer and inner surfaces of the sections and disc to a temperature sufficient to cause the sections to soften and the disc to move downwardly under its own weight and that of the section resting upon it, the surface of the disc becoming oxidized during the heating, guiding the disc in its downward movement, arresting the downward travel of the disc after it is moved through a predetermined distance, mechanically re-shaping the top glass section, discontinuing the flame heating, heating the disc by high frequency induction to a temperature higher than that to which it was heated by the flames and for a sufficient length of time to insure absorption in the glass of oxides on the surface of the metal, discontinuing the induction heating, heating the glass sections and disc by flame to a temperature at which the glass is soft, and mechanically re-shaping the top glass section.

RAYMOND R. MACHLETT.
GOTTFRID W. STEEN.

REFERENCES CITED

The following references are of record in the file of this patent:

UNITED STATES PATENTS

| Number | Name | Date |
| --- | --- | --- |
| 1,740,443 | Donat | Dec. 24, 1929 |
| 1,995,803 | Gilbert | Mar. 26, 1935 |
| 2,048,556 | McArthur | July 21, 1936 |
| 2,125,316 | Ronci | Aug. 2, 1938 |
| 2,167,431 | Bowie | July 25, 1939 |
| 2,297,492 | Michaelis | Sept. 29, 1942 |
| 2,345,278 | Monack | Mar. 28, 1944 |
| 2,376,439 | Machlett et al. | May 22, 1945 |